(12) United States Patent
Ushio et al.

(10) Patent No.: US 8,675,048 B2
(45) Date of Patent: Mar. 18, 2014

(54) IMAGE PROCESSING APPARATUS, IMAGE PROCESSING METHOD, RECORDING METHOD, AND RECORDING MEDIUM

(75) Inventors: Yoshijiro Ushio, Yokohama (JP); Yutaka Ichihara, Yokohama (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 13/187,493

(22) Filed: Jul. 20, 2011

(65) Prior Publication Data
US 2011/0310097 A1 Dec. 22, 2011

Related U.S. Application Data

(63) Continuation of application No. PCT/JP2010/000172, filed on Jan. 14, 2010.

(30) Foreign Application Priority Data

Jan. 21, 2009 (JP) .................................. 2009-011037

(51) Int. Cl.
*G06T 15/00* (2011.01)

(52) U.S. Cl.
USPC .......................................................... 348/46

(58) Field of Classification Search
None
See application file for complete search history.

(56) References Cited

U.S. PATENT DOCUMENTS

| | | | |
|---|---|---|---|
| 6,388,639 B1 | 5/2002 | Hoshino et al. | |
| 6,584,219 B1 | 6/2003 | Yamashita et al. | |
| 2003/0227450 A1 | 12/2003 | Satoh et al. | |
| 2006/0087556 A1* | 4/2006 | Era | 348/51 |
| 2006/0203085 A1* | 9/2006 | Tomita | 348/51 |
| 2006/0290778 A1 | 12/2006 | Kitaura et al. | |
| 2007/0176914 A1 | 8/2007 | Bae et al. | |
| 2007/0236493 A1* | 10/2007 | Horiuchi et al. | 345/419 |
| 2009/0102915 A1* | 4/2009 | Arsenich | 348/53 |

FOREIGN PATENT DOCUMENTS

| | | |
|---|---|---|
| CN | 1795682 | 6/2006 |
| JP | 06-038246 | 2/1994 |
| JP | 07-129095 | 5/1995 |

(Continued)

OTHER PUBLICATIONS

International Search Report for corresponding International Application No. PCT/JP2010/000172, Apr. 13, 2010.

(Continued)

*Primary Examiner* — Hung Dang
*Assistant Examiner* — Sunghyoun Park
(74) *Attorney, Agent, or Firm* — Ditthavong Mori & Steiner, P.C.

(57) ABSTRACT

Provided is an image processing apparatus that stereoscopically displays a two-dimensional image, comprising a generating section that generates a left-side image and a right-side image by shifting the two-dimensional image left and right in a display region; and an output section that outputs the left-side image to a left eye of the user and the right-side image to a right eye of the user. The generating section generates the left-side image and the right-side image by shifting the two-dimensional image to the left and right within the display region by a distance no greater than a distance between pupils of a user.

24 Claims, 10 Drawing Sheets

(56) References Cited

FOREIGN PATENT DOCUMENTS

| | | |
|---|---|---|
| JP | 08-205201 | 8/1996 |
| JP | 09-116929 | 5/1997 |
| JP | 09-146038 | 6/1997 |
| JP | 10-117362 | 5/1998 |
| JP | 10-333094 | 12/1998 |
| JP | 11-98531 | 4/1999 |
| JP | 2002-262310 | 9/2002 |
| JP | 2002-365593 | 12/2002 |
| JP | 2004-320189 | 11/2004 |
| JP | 2005-73049 | 3/2005 |

OTHER PUBLICATIONS

International Preliminary Report on Patentability with Written Opinion of the International Searching Authority for corresponding International Application No. PCT/JP2010/000172, Aug. 18, 2011.

Japanese Office Action for corresponding JP Application No. 2009-011037, Feb. 26, 2013.

Chinese Office Action for corresponding CN Application No. 201080005153.5, Jun. 13, 2013.

Japanese Office Action for corresponding JP Application No. 2009-011037, Sep. 17, 2013.

* cited by examiner

IMAGE PROCESSING APPARATUS, IMAGE PROCESSING METHOD, RECORDING METHOD, AND RECORDING MEDIUM

CROSS REFERENCE TO RELATED APPLICATION

This is a continuation application of PCT/JP2010/000172 filed on Jan. 14, 2010 which claims priority from a Japanese Patent Application No. 2009-011037 filed on Jan. 21, 2009, the contents of which are incorporated herein by reference.

BACKGROUND

1. Technical Field

The present invention relates to an image processing apparatus, an image processing method, a recording method, and a recording medium.

2. Related Art

There are conventionally known techniques for displaying a stereoscopic (3D) image. One technique for displaying a stereoscopic image involves generating a right-eye image of an object seen by the right eye and a left-eye image of the object seen by the left eye, and displaying the right-eye image to only the right eye of a user and the left-eye image to only the left eye of the user. This technique is referred to as stereoscopic viewing.

Patent Document 1: Japanese Patent Application Publication No. H10-117362
Patent Document 2: Japanese Patent Application Publication No. 2002-262310
Patent Document 3: Japanese Patent Application Publication No. H08-205201

This stereoscopic viewing technology, however, provides an image that appears unnatural to the user. With stereoscopic viewing technology, an object image displayed on the screen appears to jump out or fall back due to a parallax effect between the viewpoint of each eye of the user. Therefore, compared to looking at a normal stereoscopic object, the stereoscopic image is perceived differently by the brain, which can make the object appear unnatural. A main cause of this phenomenon is a mismatch between the convergence and the adjustment of sight, i.e. when the point at which the lines of sight intersect differs from the correct focal point of the actual object.

Furthermore, stereoscopic viewing technology is expensive, due to the need to generate parallax images to achieve the stereoscopic image. In stereoscopic viewing technology, it is necessary to generate two images, e.g. a left-side image and a right-side image, that create a parallax effect when viewed from a single location. Accordingly, when capturing an image, the parallax images must be captured by two or more cameras that are arranged and controlled appropriately, and this incurs a high cost. Furthermore, it is also expensive to generate parallax images when combining artificial images, such as in computer graphics.

There are various methods proposed for generating the parallax images based on a two-dimensional image. One such method involves displaying a plurality of images captured at different times to the right eye and the left eye, respectively. Another example involves generating the parallax images from the two-dimensional image by analyzing the two-dimensional image and having the user attach depth information thereto. However, all of these methods involve complex manual operations and judgments by the user, and also have high cost.

Another method proposed involves stereoscopically displaying an image without creating a parallax effect between the image for the left eye and the image for the right eye, as described in Patent Documents 1 to 3, for example. With these methods, however, there is no clear and specific process for suitably displaying the stereoscopic image.

SUMMARY

Therefore, it is an object of an aspect of the innovations herein to provide an image processing apparatus, an image processing method, a recording method, and a recording medium, which are capable of overcoming the above drawbacks accompanying the related art. The above and other objects can be achieved by combinations described in the independent claims. The dependent claims define further advantageous and exemplary combinations of the innovations herein.

According to a first aspect related to the innovations herein, provided is an image processing apparatus that stereoscopically displays a two-dimensional image, comprising a generating section that generates a left-side image and a right-side image by shifting the two-dimensional image left and right in a display region; and an output section that includes the display region in which a region where the left-side image and the right-side image are not displayed together is arranged outside an effective field of vision of a user, and that outputs, via the region in which the left-side image and the right-side image are not displayed together, the left-side image to a left eye of the user and the right-side image to a right eye of the user. Also provided is an image processing method and a recording medium storing thereon a program that causes a computer to function as the image processing apparatus.

According to a first aspect related to the innovations herein, provided is a recording method for recording image data that enables a two-dimensional image to be displayed stereoscopically, comprising generating image data of a left-side image and a right-side image obtained by shifting the two-dimensional image left and right within a display region; recording the image data of the left-side image in a left-side image data storage region in a recording medium, the left-side image data storage region holding an image to be read by a reproducing apparatus and output to a left eye of a user; and recording the image data of the right-side image in a right-side image data storage region in the recording medium, the right-side image data storage region holding an image to be read by the reproducing apparatus and output to a right eye of a user. Also provided is a recording medium on which data is recorded according to the recording method.

The summary clause does not necessarily describe all necessary features of the embodiments of the present invention. The present invention may also be a sub-combination of the features described above.

DESCRIPTION OF EXEMPLARY EMBODIMENTS

Hereinafter, some embodiments of the present invention will be described. The embodiments do not limit the invention according to the claims, and all the combinations of the features described in the embodiments are not necessarily essential to means provided by aspects of the invention.

Figure 1:
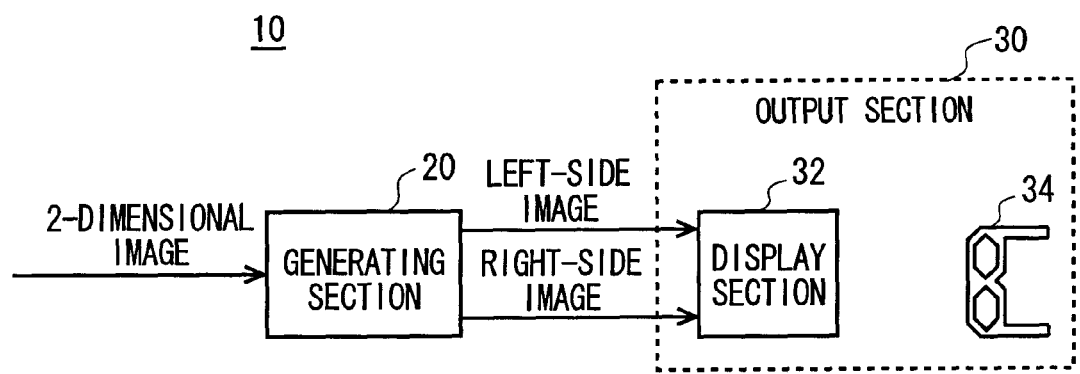
FIG. 1 shows a configuration of an image processing apparatus 10 according to an embodiment of the present invention.

FIG. 1 shows a configuration of an image processing apparatus 10 according to an embodiment of the present invention. The image processing apparatus 10 is capable of stereoscopically displaying a two-dimensional image provided thereto. More specifically, the image processing apparatus 10 generates an image to be output to the right eye of a user and an image to be output to the left eye of the user, based on the two-dimensional image supplied thereto, and displays the generated images on a display apparatus. The two-dimensional image may be a still image or may be a moving image that includes a plurality of still images that change over time.

The image processing apparatus 10 includes a generating section 20 and an output section 30. The generating section 20 may receive the two-dimensional image from a receiving apparatus that receives transmitted data or from a reproducing apparatus that reproduces data from a recording medium, for example.

The generating section 20 generates a right-side image and a left-side image, which are distanced from each other in a two-dimensional image display region by no more than the distance between the right and left pupils of a user. The generating section 20 may generate the left-side image and the right-side image based on the same two-dimensional image.

The distance between the pupils is the normal distance between the pupils of a person, i.e. from 40 mm to 90 mm. When the left-side image and the right-side image are displayed at positions separated from each other by this distance, a person can see the object displayed in the left-side image for the left eye and the object displayed in the right-side image for the right eye together as a single image, and this image can appears to be infinitely distant. In this case, the lines of sight for the eyes of the viewer are parallel. Accordingly, the generating section 20 preferably generates the left-side image and the right-side image by shifting the two-dimensional image to the left and right in the display region by more than 0 mm and less than or equal to 90 mm.

A person can see the combined image with both eyes, even if the lines of sight are shifted by 2 to 3 degrees to the left or right from the parallel state. Accordingly, the distance between the left-side image and the right-side image may be the distance obtained by shifting the line of sight of the left eye by three degrees or less, preferably two degrees or less, to the left from the parallel state and shifting the line of sight of the right eye by three degrees or less, preferably two degrees or less, to the right from the parallel state. The tolerable amount that the distance between the left-side image and the right-side image may differ from the distance between the pupils is greater when the distance between the viewer and the display surface is greater.

The display region is a region of an image display section in the display apparatus for providing the user with the stereoscopic image. More specifically, the display region may be formed in a single screen, such as the display surface of a television or one window displayed in a monitor of a computer. As another example, the display region may be a region formed by two screens, such as the display surfaces of a head-mounted display. The generating section 20 may change the distance between the left-side image and the right-side image, as measured by pixels, according to the size of the display region and the pixel size of the two-dimensional image supplied thereto, such that the actual distance between the left-side image and the right-side image in the display region is equal to the distance between the pupils of the user.

The generating section 20 generates the left-side image by shifting the original two-dimensional image to the left, for example. The generating section 20 generates the right-side image by shifting the original two-dimensional image to the right, for example. The generating section 20 may delete a portion of the left-side image, obtained by shifting the original two-dimensional image to the left, protruding to the left from the right-side border of the display region. The generating section 20 may delete a portion of the right-side image, obtained by shifting the original two-dimensional image to the right, protruding to the right from the left-side border of the display region.

The generating section 20 may attach a new image to the right side of the left-side image generated by shifting the original two-dimensional image to the left. The generating section 20 may attach a new image to the left side of the right-side image generated by shifting the original two-dimensional image to the right. In this way, the generating section 20 can superimpose newly attached images over the blank area created to the right of the left-side image in the image region and the blank area created to the left of the right-side image in the image region as a result of generating the right-side image and the left-side image by shifting the original two-dimensional image. In this case, the generating section 20 may attach images having dark colors or predetermined colors, for example.

If the image processing apparatus 10 provides the stereoscopic image using a display apparatus that has one display region, the generating section 20 may use an image displayed on one set of horizontal lines in the display region selected alternately in the vertical direction, e.g. even-numbered lines, as the left-side image. The generating section 20 may use an image displayed on the other set of horizontal lines in the display region selected alternately in the vertical direction, e.g. odd-numbered lines, as the right-side image.

As another example, if the image processing apparatus 10 provides the stereoscopic image using a display apparatus that has one display region, the generating section 20 may use an image displayed in one set of frames selected alternately over time from among the frames of a moving image, e.g. even-numbered frames, as the left-side image. The generating section 20 may use an image displayed in the other set of frames selected alternately over time from among the frames of the moving image, e.g. odd-numbered frames, as the right-side image.

If the image processing apparatus 10 provides the stereoscopic image using a display apparatus that has a left-eye display screen and a right-eye display screen, such as a head-mounted display, the generating section 20 displays the image shown in the left-eye display screen as the left-side image and displays the image shown in the right-eye display screen as the right-side image.

The generating section 20 may perform a process to generate the left-side image and the right-side image using a software computation of a computer. Instead, the generating section 20 may perform image processing in real time on a vide signal that is reproduced or transmitted in real time.

The output section 30 includes a display region in which a region where the left-side image and the right-side image are not superimposed on each other is positioned outside the effective field of vision of the user. Using this display region, the output section 30 outputs the left-side image generated by the generating section 20 to the left eye of the user. Furthermore, using this display region, the output section 30 outputs the right-side image generated by the generating section 20 to the right eye of the user.

For example, the output section 30 may display the left-side image and the right-side image superimposed on each other within a display region formed on a single screen, such as a stationary liquid crystal display. Instead, the output section 30 may display the left-side image and the right-side image independently in a display region formed by two screens, such as a head-mounted display.

In the present embodiment, the output section 30 includes a display section 32 and stereoscopic viewing glasses 34. The display section 32 includes a plurality of pixels arranged in a two-dimensional matrix forming a display region in which pixel lines for displaying an image to the right eye of the user and pixel lines for displaying an image to the left eye of the user are arranged in an alternating manner. The stereoscopic viewing glasses 34 transmit the image displayed by the pixel lines of the display section 32 displaying the image for the right eye to only the right eye of the user, and transmit the image displayed by the pixel lines of the display section 32 displaying the image for the left eye to only the left eye of the user. When the output section 30 includes the display section 32 and the stereoscopic viewing glasses 34, the generating section 20 generates the left-side image from the pixels of the two-dimensional image corresponding to the pixel lines used for the left eye in the display region, and generates the right-side image from the pixels of the two-dimensional image corresponding to the pixel lines used for the right eye in the display region. The generating section 20 can generate the left-side image and the right-side image by shifting the pixel data horizontally in groups of pixel lines, and therefore the generating section 20 can have a simple circuit configuration.

The display section 32 may emit circularly-polarized light with a first rotational direction from the left-eye pixel lines. The display section 32 may emit circularly-polarized light with a second rotational direction, which is the opposite of the first rotational direction, from the right-eye pixel lines. The display section 32 displays the left-side image resulting from the left-eye pixel lines and the right-side image resulting from the right-eye pixel lines.

The stereoscopic viewing glasses 34 include a left-eye polarization filter, which is arranged over the left eye of the user to transmit circularly-polarized light having the first rotational direction and block circularly-polarized light having the second rotational direction, and a right-eye polarization filter, which is arranged over the right eye of the user to transmit circularly-polarized light having the second rotational direction and block circularly-polarized light having the first rotational direction. As a result, the stereoscopic viewing glasses 34 can provide the left-side image displayed by the left-eye pixels lines of the display section 32 to the left eye and the right-side image displayed by the right-eye pixels lines of the display section 32 to the right eye.

The output section 30 may have any configuration, as long as it can provide the left-side image to only the left eye of the user and provide the right-side image to only the right eye of the user. For example, the output section 30 may include a display apparatus that displays the left-side image and the right-side image alternately over time, and shuttered glasses having shutters synchronized with the display apparatus. In this case, the shuttered glasses open the left-eye shutter and close the right-eye shutter when the left-side image is being displayed, and close the left-eye shutter and open the right-eye shutter when the right-side image is being displayed. With this output section 30, the left-side image can be provided only to the left eye of the user and the right-side image can be provided only to the right eye of the user.

As another example, the output section 30 may be a head-mounted display having a left-eye display screen and a right-eye display screen. The output section 30 may use color filters or differences in light splitting characteristics or polarization directions to provide the left-side image only to the left eye of the user and the right-side image only to the right eye of the user.

In the manner described above, the image processing apparatus 10 generates a stereoscopic image by shifting a two-dimensional image to the right and left. As a result, the image processing apparatus 10 can provide a user with a stereoscopic image at a low cost using an extremely simple process.

Figure 2:
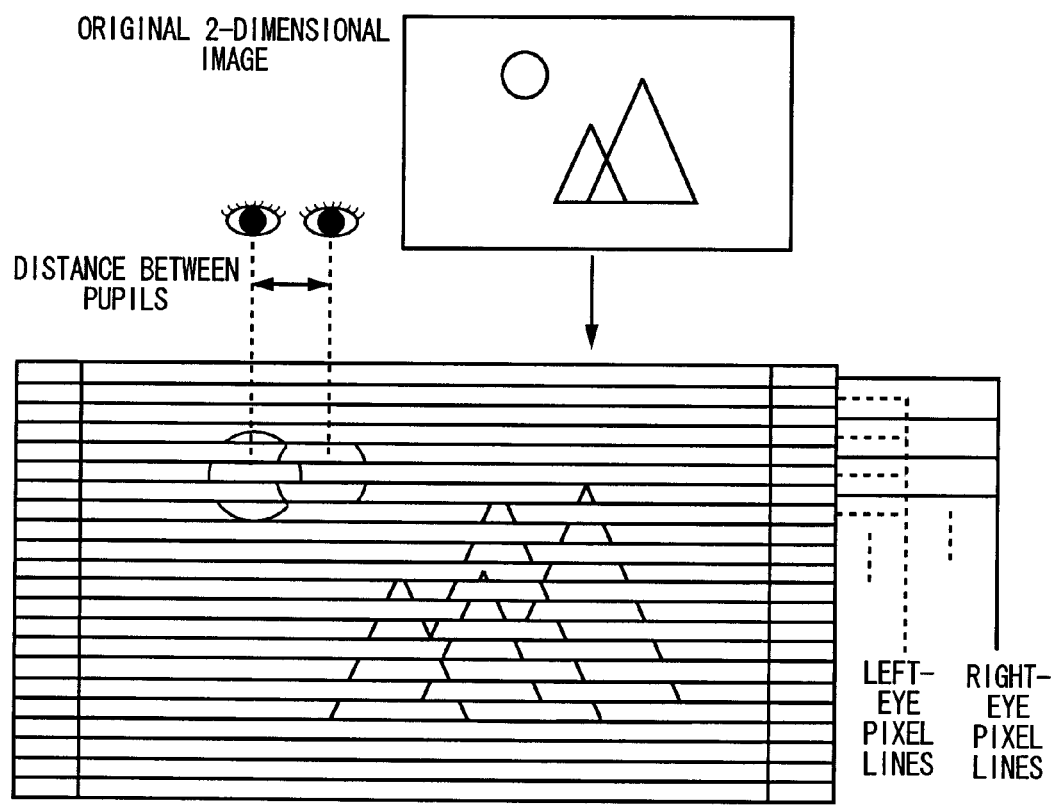
FIG. 2 shows an exemplary display on the display section 32.

FIG. 2 shows an exemplary display on the display section 32. In the display section 32, the left-eye pixel lines are one set of horizontal lines in the display region selected alternately in the vertical direction, e.g. even-numbered lines, and the right-eye pixel lines are the other set of horizontal lines selected alternately in the display region in the vertical direction, e.g. odd-numbered lines. In this case, the generating section 20 generates the left-side image from the pixels of the two-dimensional image corresponding to the left-eye pixel lines in the display region of the display section 32, and generates the right-side image from the pixels of the two-dimensional image corresponding to the right-eye pixel lines used in the display region of the display section 32. Therefore, in combination with the stereoscopic viewing glasses 34, the display section 32 can provide the left-side image displayed by the left-eye pixel lines to only the left eye and provide the right-side image displayed by the right-eye pixel lines to only the left eye.

Figure 3:
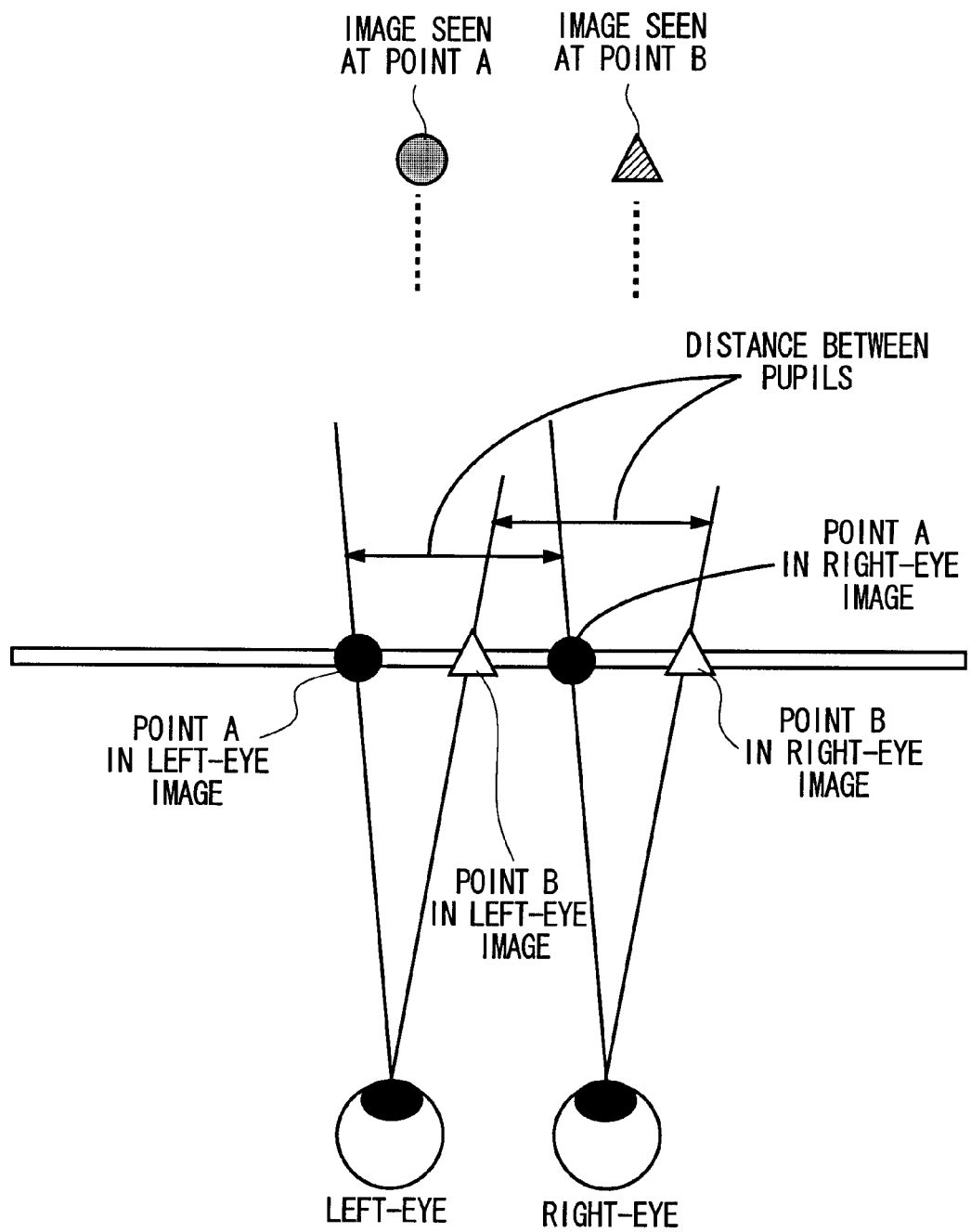
FIG. 3 shows examples of a point where the left-side image is displayed, a point where the right-side image is displayed, and the resulting image perceived by the user.

FIG. 3 shows examples of a point where the left-side image is displayed, a point where the right-side image is displayed, and the resulting image perceived by the user. When a person looks at a two-dimensional image at a short distance, the person experiences a parallax effect that causes the image provided to the left eye and the image provided to the right eye to appear different. Based on this parallax effect, a person can recognize that the object being viewed is two-dimensional. When a person views an object that is infinitely distant, e.g. at a distance of 10 meters or more, the image provided to the left eye and the image provided to the right eye appear the same. When a person views an object that is infinitely distant, the lack of parallax effect between the image provided to the left eye and the image provided to the right eye causes the person to perceive the object as a real-life stereoscopic object.

The image processing apparatus 10 generates the right-side image and the left-side image without the parallax effect by shifting the original image to the right and left by a distance equal to the distance between the pupils of the user. In other words, the image processing apparatus 10 generates the right-side image and the left-side image to appear the same. The image processing apparatus 10 provides the left-side image to only the left eye of the user and provides the right-side image to only the right eye of the user. As a result, the image processing apparatus 10 can cause the lines of sight of the left eye and the right eye of the user to be parallel. In other words, the lines of sight of each eye of the user do not converge, i.e. the lines of sight do not cross each other. Therefore, the image processing apparatus 10 can cause the user to perceive an object as being infinitely distant. For example, as shown in FIG. 3, the image processing apparatus 10 causes the user to perceive both point A (the black circle) and point B (the triangle) at an infinitely distant position.

By providing an image that does not create a parallax effect between the left and right eyes and that appears infinitely distant to the user, the image processing apparatus 10 can provide the user with an image that seems stereoscopic. For example, the image processing apparatus 10 can create the feeling that the user is looking through a window at an image of a landscape. Furthermore, the image processing apparatus 10 can create the impression that an image captured close-up, such as using a macro exposure, is being viewed through a magnifying glass.

The reason why the image processing apparatus 10 can provide an image that seems so realistic is explained below. The image processing apparatus 10 does not cause the lines of sight of the user to converge, and therefore the user cannot identify the position of an object in the image based on the parallax effect. However, even if there is no parallax effect, a person can estimate the position of an object image based on the size and angle of the actual object derived from experience and common sense. The person can then instantaneously and unconsciously estimate the position of the object to get a sense of the stereoscopic nature and dimensions of the object. Accordingly, even though the image processing apparatus 10 does not cause the lines of sight of the eyes of the user to converge, the user is still provided with an image that seems real.

When a person views a moving image, the objects that are farther away appear to move less and objects that are closer appear to move more. When viewing a moving image, a person obtains a greater sense of the image being stereoscopic from the movement of the objects therein than from the parallax effect. Accordingly, when displaying a moving image, the image processing apparatus 10 can more strongly impress upon the user the feeling that the objects are stereoscopic.

The image processing apparatus 10 does not cause a "cardboard effect," which is a phenomenon whereby objects appear to be flattened in depth, nor does the image processing apparatus 10 cause a "puppet-theater effect," which is phenomenon whereby the impression that an image expands laterally is lessened due to the perception of depth being emphasized. Accordingly, the image processing apparatus 10 can provide a stereoscopic image that appears realistic and natural.

The image processing apparatus 10 does not cause the lines of sight of the eyes of the user to converge. As a result, a mismatch between convergence and adjustment of the view of the user does not occur, thereby decreasing the feeling that the image is unnatural. Furthermore, the image processing apparatus 10 causes the stereoscopic images to appear at positions beyond the screen, thereby impressing upon the user a sense that they are looking through a frame, such as a window or a magnifying glass. Accordingly, the image processing apparatus 10 does not cause a phenomenon whereby the images seeming to jump out from the screen are unnaturally cut off by the screen frame, and can therefore provide the user with a natural stereoscopic image.

The generating section 20 may attach a frame image to be displayed as the outer frame, such as a black frame image, to the left-side image and the right-side image. In this way, the image processing apparatus 10 can strengthen the impression that the user is viewing objects through a frame.

Figure 4:
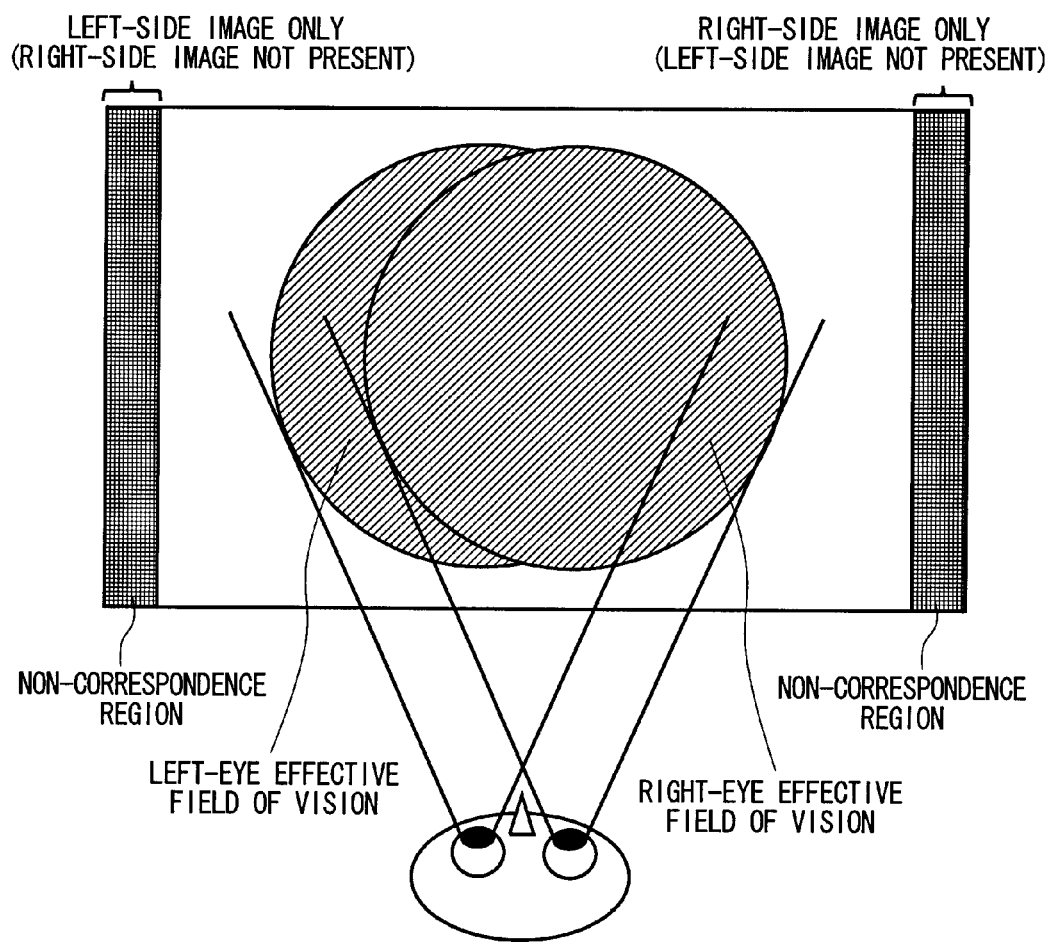
FIG. 4 shows examples of an effective field of vision of a user in the display region and a non-correspondence region, in which only one of the left-side image and the right-side image is displayed.

FIG. 4 shows examples of an effective field of vision of a user in the display region and a non-correspondence region, in which only one of the left-side image and the right-side image is displayed. The left edge of the display region includes a non-correspondence region in which the left-side image, but not the right-side image, resulting from the shifting of one two-dimensional image to the left and right is displayed. The right edge of the display region includes a non-correspondence region in which the right-side image, but not the left-side image, resulting from the shifting of one two-dimensional image to the left and right is displayed. The non-correspondence regions cannot provide a stereoscopic image to the user.

A region visible to a person includes an effective field of vision and a peripheral field of vision. The effective field of vision has excellent resolving power and color recognition, uses lines of sight that move quickly, and is used to consciously recognize objects. In other words, when viewing a television image or a painting, for example, the effective field of vision is the range that the viewer is aware of. The peripheral field of vision can be dimly sensed by the viewer, but is practically useless for cognitive recognition, such as identifying who someone is or reading letters.

The image processing apparatus 10 preferably displays the left-side image and the right-side image in a display region that is large enough that the non-correspondence regions are positioned outside the effective field of vision. Therefore, the image processing apparatus 10 can prevent the user from being consciously aware of the images shown in the non-correspondence regions that cannot provide stereoscopic images.

The image processing apparatus 10 preferably displays the left-side image and the right-side image in a display region whose horizontal width is expressed by Expression 1 shown below. In Expression 1, W represents the horizontal width of the display region, D represents the distance from the viewpoint of the user to the display screen, L represents the distance between the pupils of the user, and $\theta$ represents the angle of the effective field of vision of the user. Here, $\theta$ is usually approximately 20°.

$$W \geq (3 \times L) + (2 \times D \times \mathrm{Sin}(\theta/2))$$ Expression 1

In other words, the horizontal width W of the display region is preferably greater than or equal to the sum of three times the distance between the pupils ($3 \times L$) and the product of the sine of half the angle of the field of vision and double the distance from the viewpoint of the user to the display screen ($2 \times D \times \mathrm{Sin}(\theta/2)$).

Based on the above, the generating section 20 generates the left-side image and the right-side image for a display region whose horizontal width is expressed by Expression 1. As a result, the image processing apparatus 10 can provide a stereoscopic image that looks natural.

The generating section 20 may generate the left-side image and the right-side image by shifting the two-dimensional image to the right and left to provide a stereoscopic image to the user, on a condition that the screen of the display section 32 has a width W expressed by Expression 1. With a widescreen (aspect ratio 16:9) television, the distance from the viewpoint of the user to the center of the display screen should be approximately three times the vertical screen size. Accordingly, the generating section 20 can provide the user with a stereoscopic image on a condition that the display section 32 is a wide-screen television with a width of 20 inches or more, for example.

Figure 5:
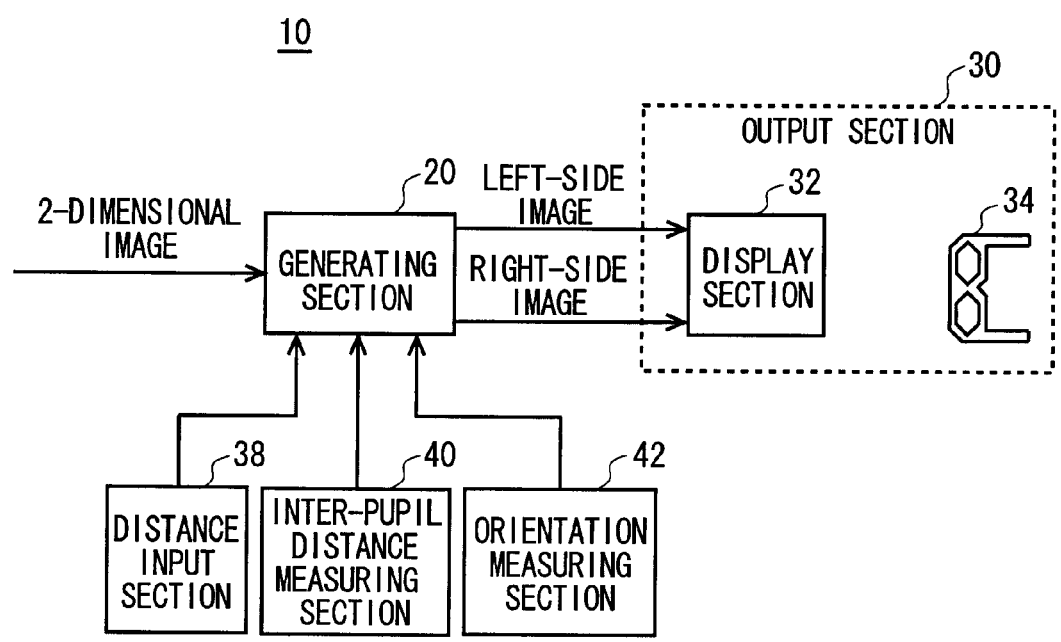
FIG. 5 shows an exemplary configuration of the image processing apparatus 10 according to a first modification of the present embodiment.
Figure 6:
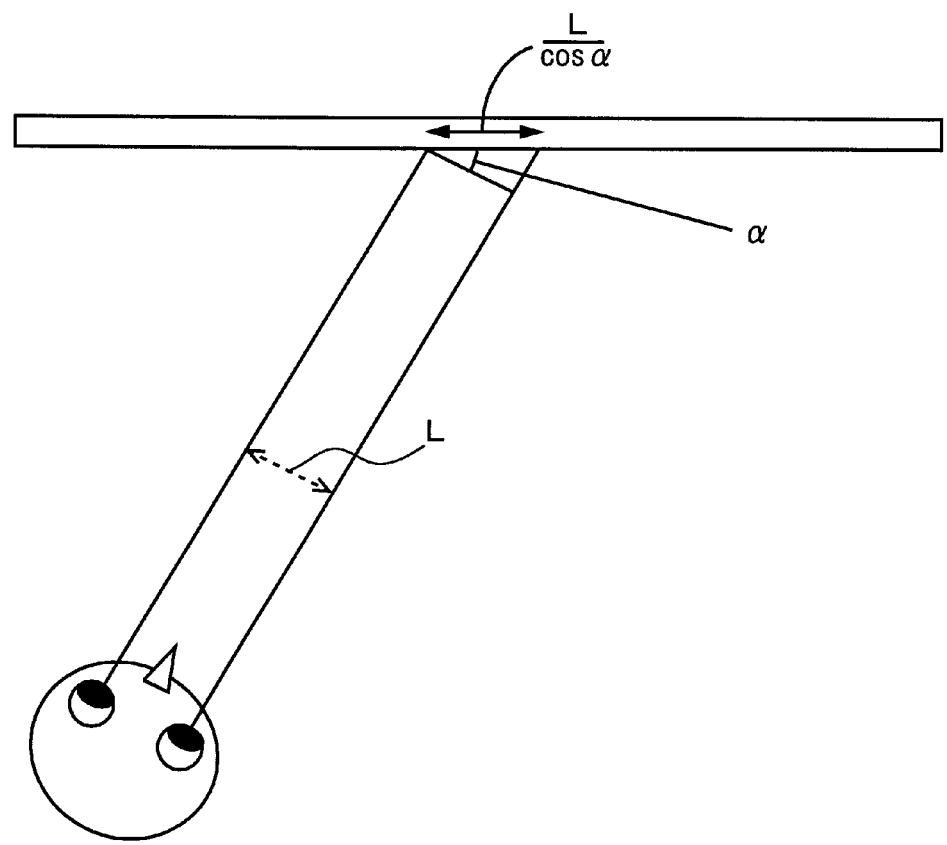
FIG. 6 shows an exemplary distance between the left-side image and the right-side image when the user views the display screen from an angle.

FIG. 5 shows an exemplary configuration of the image processing apparatus 10 according to a first modification of the present embodiment. FIG. 6 shows an exemplary distance between the left-side image and the right-side image when the user views the display screen from an angle. The image processing apparatus 10 of the present modification adopts substantially the same function and configuration as the image processing apparatus 10 shown in FIG. 1, and therefore components having substantially the same function and configuration are given the same reference numerals and the following description includes only differing points.

The generating section 20 of the present modification adjusts the distance between the left-side image and the right-side image according to the distance between the pupils of the user. For example, the generating section 20 may adjust the distance between the left-side image and the right-side image, according to conditions such as each individual user or a certain state of a user. In this way, the generating section 20 can provide the user with a stereoscopic image that looks more natural.

The image processing apparatus 10 of the present modification may further include a distance input section 38 into which is input the distance between the left-side image and the right-side image designated via a remote control or the like operated by the user. In this case, the generating section 20 adjusts the distance between the left-side image and the right-side image according to the distance input to the distance input section 38. The image processing apparatus 10 including the distance input section 38 can be adjusted by the user to output a suitable stereoscopic image. The generating section 20 may display the current distance of the images to enable the user to make more accurate adjustments.

The image processing apparatus 10 according to the present modification may further include an inter-pupil distance measuring section 40 that measures the distance between the pupils of the user. In this case, the generating section 20 adjusts the distance between the left-side image and the right-side image according to the distance between the pupils measured by the inter-pupil distance measuring section 40. The inter-pupil distance measuring section 40 may detect the eyes of the user, based on an image of the face of the user acquired by an image capturing sensor affixed to the display section 32, and measure the distance between the pupils. The inter-pupil distance measuring section 40 may measure the distance between the pupils prior to displaying the stereoscopic image, or while displaying the stereoscopic image. The image processing apparatus 10 including the inter-pupil distance measuring section 40 can output stereoscopic images that are suitable for each of a plurality of users.

The image processing apparatus 10 of the present modification may further include an orientation measuring section 42 that measures orientation of the face of the user with respect to the display section 32 displaying the left-side image and the right-side image. In this case, the generating section 20 adjusts the distance between the left-side image and the right-side image according to the face orientation measured by the orientation measuring section 42. The image processing apparatus 10 including the orientation measuring section 42 can provide a suitable stereoscopic image even when the user is not viewing the display section 32 from directly in front.

As shown in FIG. 6, with α representing an angle between the face of the user and the display screen of the display section 32, i.e. an angle between the direction of the face of the user and a line normal to the display screen, and L representing the distance between the pupils of the user, the generating section 20 may adjust the distance between the left-side image and the right-side image displayed in the display region to be L/cos(α). In other words, this distance is adjusted to be the result obtained by dividing the distance (L) between the pupils of the user by cosine (cos(α)) of the angle of the face of the user with respect to the display surface of the display section 32. As a result, the generating section 20 can accurately calculate the distance between the left-side image and the right-side image in the display region.

The orientation measuring section 42 may measure the orientation of the face of the user based on an image of the face of the user obtained by an image capturing sensor or the like mounted on the display section 32. As another example, the orientation measuring section 42 may measure the orientation of the face of the user based on a signal obtained from a sensor provided in the stereoscopic viewing glasses 34.

The generating section 20 of the present modification may change the distance between the left-side image and the right-side image according to position within the display region. For example, the generating section 20 may continuously change the distance between the left-side image and the right-side image according to the position in the vertical direction in the display region. The generating section 20 may set the distance to be smallest at the vertical center of the image display region, and gradually increase the distance while moving toward the top and bottom of the display region. In this way, the image processing apparatus 10 can provide the user with a stereoscopic image in which the image appears to be displayed on a spherical surface.

In an image captured by a camera, for example, the lower portion of the image is usually the foreground while the upper portion of the image is the background. The generating section 20 can create the impression that an object is farther away by increasing the distance between the left-side image and the right-side image. Accordingly, the generating section 20 may set a small distance between the left-side image and the right-side image in a portion of the image near the bottom of the display region, and set a large distance between the left-side image and the right-side image in a portion of the image near the top of the display region. In this case, the generating section 20 may continuously increase the distance between the left-side image and the right-side image while moving from the bottom toward the top of the image. As a result, the generating section 20 can provide the user with a stereoscopic image that looks more natural.

Furthermore, in this case, the generating section 20 of the present modification may respectively shift the left-side image and the right-side image by the same distance but in opposite directions. In this way, the generating section 20 can set the same distance between the left-side image and the right-side image at each position in the horizontal direction.

The generating section 20 of the present modification may change the distance between the left-side image and the right-side image according to the size of the display region. In this way, the image processing apparatus 10 provide the user with a suitable stereoscopic image according to the size of the display region.

Figure 7:
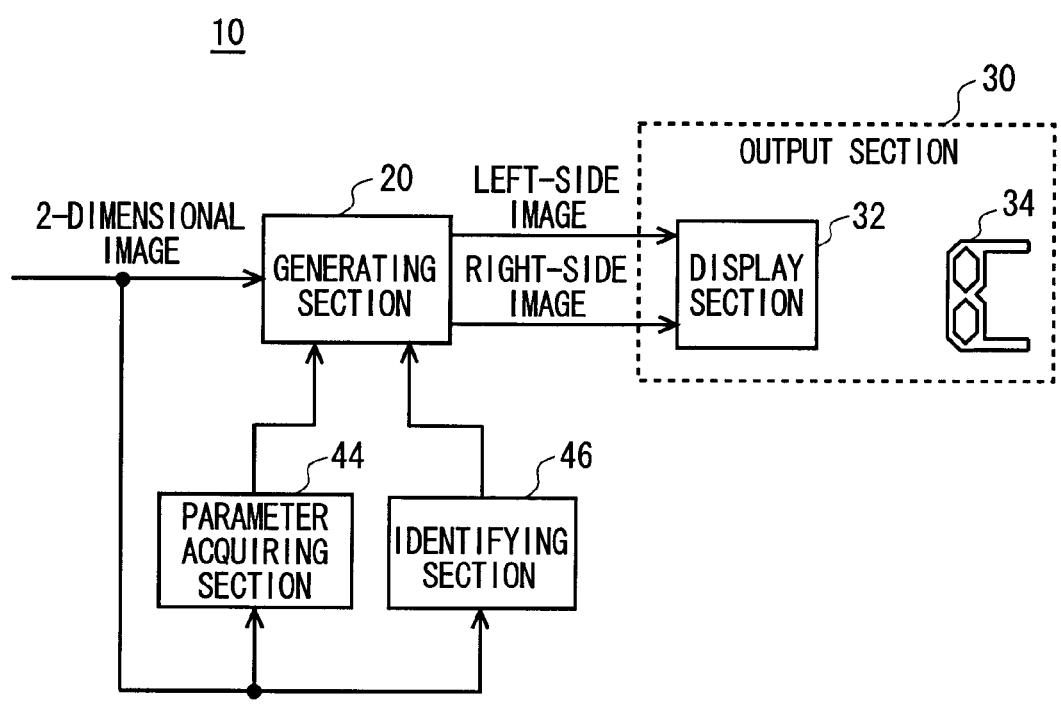
FIG. 7 shows an exemplary configuration of the image processing apparatus 10 according to a second modification of the present embodiment.

FIG. 7 shows an exemplary configuration of the image processing apparatus 10 according to a second modification of the present embodiment. The image processing apparatus 10 of the present modification adopts substantially the same function and configuration as the image processing apparatus 10 shown in FIG. 1, and therefore components having substantially the same function and configuration are given the same reference numerals and the following description includes only differing points.

In the present modification, the image processing apparatus 10 can stereoscopically display a plurality of two-dimensional images included in a moving image. The image processing apparatus 10 of the present modification further includes a parameter acquiring section 44.

The parameter acquiring section 44 acquires parameters that designate a distance between the left-side image and the right-side image received in association with each of the two-dimensional images. For example, the parameter acquiring section 44 may acquire parameters included in information attached to a moving image, or may acquire parameters supplied thereto independently of the moving image. These parameters may be values input independently by the creator of the moving image or distance information used when controlling the focus while capturing the moving image, for example.

The generating section 20 changes the distances between the left-side images and the right-side images according to the parameters acquired by the parameter acquiring section 44. As a result, the image processing apparatus 10 can suitably adjust the distance between the left-side images and the right-side images according to the content of the moving image.

When the parameter acquiring section 44 receives parameters, in association with a two-dimensional image included in the moving image, indicating that this two-dimensional image cannot be displayed stereoscopically, the generating section 20 may set the distance between the left-side image and the right-side image to be 0. As an example, the parameter acquiring section 44 may communicate with the stereoscopic viewing glasses 34 to detect whether the user is wearing the stereoscopic viewing glasses 34. If the user is not wearing the stereoscopic viewing glasses 34, the parameter acquiring section 44 determines that parameters have been received indicating that the two-dimensional image is not to be displayed stereoscopically. In this way, the generating section 20 can display a stereoscopic image when the user is wearing the stereoscopic viewing glasses 34, and display a two-dimensional image when the user is not wearing the stereoscopic viewing glasses 34.

The generating section 20 may display a thumbnail or an indicator, for example, that indicates whether a stereoscopic image is displayed. In this way, when a stereoscopic image is not being displayed, the user can remove the stereoscopic viewing glasses 34. When displaying a two-dimensional image, the generating section 20 may display notification information when a stereoscopic image is displayed after a prescribed time has passed. In this way, the image processing apparatus 10 can inform the user when to put on the stereoscopic viewing glasses 34.

The image processing apparatus 10 of the present modification may further include an identifying section 46 that identifies the scene type of the two-dimensional image. In this case, the generating section 20 changes the distance between the left-side image and the right-side image according to the scene type identified by the identifying section 46. For example, the identifying section 46 may identify whether each area in the two-dimensional image is of a close image or a distant image, based on distance information in each area acquired during the image capturing, and then increase the distance between the left-side image and the right-side image in areas of the two-dimensional image that are of distant images and decrease the distance between the left-side image and the right-side image in areas of the two-dimensional image that are of close images. In this way, the generating section 20 can adjust the distance between the right-side and left-side image such that a stereoscopic image suitable for the identified scene is displayed.

The generating section 20 may set a suitable distance between the left-side images and the right-side images according to the distance between the pupils of the user for prescribed types of scenes or for prescribed portions such as a prescribed time range or prescribed images in a moving image, and may set a distance of 0 between the left-side image and the right-side image in other scenes. In this way, the generating section 20 can display a stereoscopic image for scenes or portions to be emphasized while displaying a two-dimensional moving image.

The generating section 20 may insert a left-side image and a right-side image that do not create the parallax effect in a prescribed time range of a moving image displayed using stereoscopic images that utilize the parallax effect. In this way, the image processing apparatus 10 can provide the user with a realistic image while minimizing the stress on the eyes of the user caused by viewing a stereoscopic image.

Figure 8:
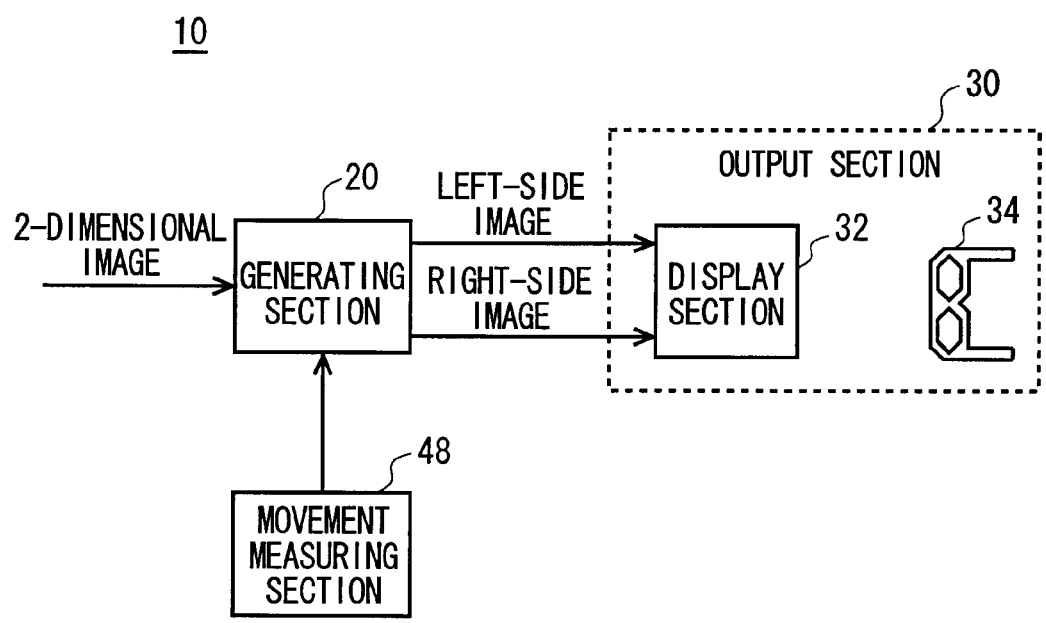
FIG. 8 shows a configuration of the image processing apparatus 10 according to a third modification of the present embodiment.

FIG. 8 shows a configuration of the image processing apparatus 10 according to a third modification of the present embodiment. The image processing apparatus 10 of the present modification adopts substantially the same function and configuration as the image processing apparatus 10 shown in FIG. 1, and therefore components having substantially the same function and configuration are given the same reference numerals and the following description includes only differing points.

The image processing apparatus 10 of the present modification further includes a movement measuring section 48 that measures movement of the head of the user. The generating section 20 changes the position of the left-side image and the right-side image in the display region according to the head movement measured by the movement measuring section 48.

When the head of the user moves to the left, for example, the generating section 20 moves the left-side image and the right-side image to the left within the display region. When the head of the user moves to the right, for example, the generating section 20 moves the left-side image and the right-side image to the right within the display region. The movement measuring section 48 may detect the head movement using a sensor provided on a headrest that supports the head of the user disposed on the back of a chair, for example.

If the positions of the left-side image and the right-side image are fixed in the display region, when the user moves their head it appears that the images in the display region also move according to the head movement. With the image processing apparatus 10 of the present modification, even if the user moves their head, the images in the display screen seem to remain at the same position. Therefore, the image processing apparatus 10 can provide the user with a stereoscopic image that appears natural. The image processing apparatus 10 of the present modification may further include a support structure such as a headrest whose position with respect to the display section 32 is fixed.

The movement measuring section 48 may further detect the inclination of a line between the left eye and right eye of the user. In this case, the generating section 20 shifts the inclination of the left-side image and the right-side image in the direction of the detected inclination. In this way, the image processing apparatus 10 can provide the user with a stereoscopic image even if the user has an inclined line of sight due to lying down, for example.

Figure 9:
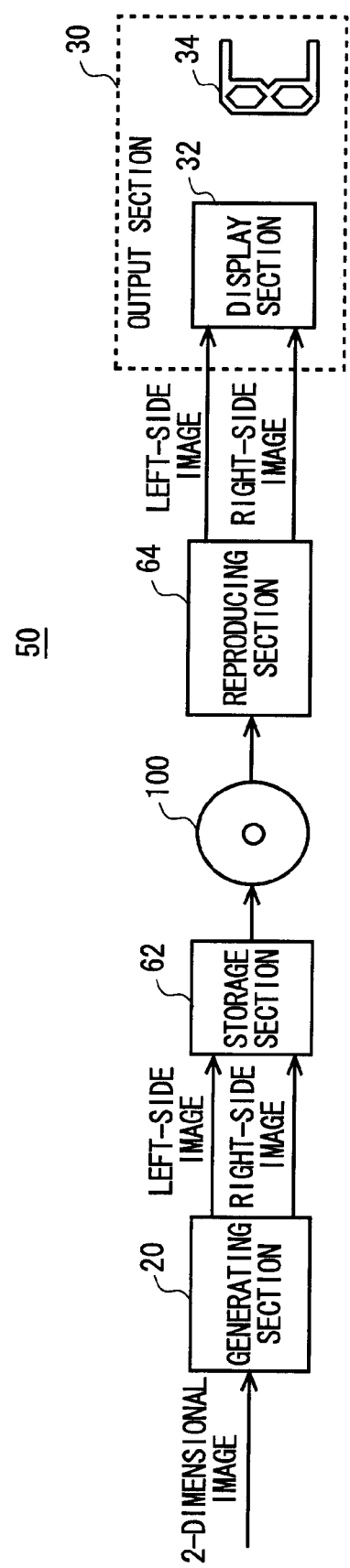
FIG. 9 shows a configuration of a recording/reproducing system 50 according to an embodiment of the present invention.

FIG. 9 shows a configuration of a recording/reproducing system 50 according to an embodiment of the present invention. The recording/reproducing system 50 generates data enabling a two-dimensional image to be displayed as a stereoscopic image, and records this data in a recording medium 100. The recording/reproducing system 50 reproduces the data from the recording medium 100 to display the stereoscopic image.

The recording/reproducing system 50 includes a generating section 20, a recording apparatus 62, a reproducing apparatus 64, and an output section 30. The generating section 20 and the output section 30 have the same function and configuration as the generating section 20 and the output section 30 described in relation to FIGS. 1 to 8. The recording/reproducing system 50 need not include the output section 30.

The recording apparatus 62 records, to the recording medium 100, the left-side image and the right-side image generated by the generating section 20. The reproducing apparatus 64 reads the left-side image and the right-side image recorded on the recording medium 100, and provides the read left-side image and right-side image to the output section 30.

The recording medium 100 records the image to be displayed stereoscopically that is read by the reproducing apparatus 64. The recording medium 100 includes a left-side image data storage region and a right-side image data storage region. The left-side image data storage region holds image data of the left-side image, which is generated by the two-dimensional image being shifted to the left in the display region and is read by the reproducing apparatus 64 to be provided to the left eye of the user. The right-side image data storage region holds image data of the right-side image, which is generated by the two-dimensional image being shifted to the right in the display region and is read by the reproducing apparatus 64 to be provided to the right eye of the user.

The recording/reproducing system 50 can generate a stereoscopic image that appears natural using a simple process, and store the stereoscopic image in the recording medium 100. The recording/reproducing system 50 can reproduce the data from the recording medium 100 to provide the user with the stereoscopic image.

Figure 10:
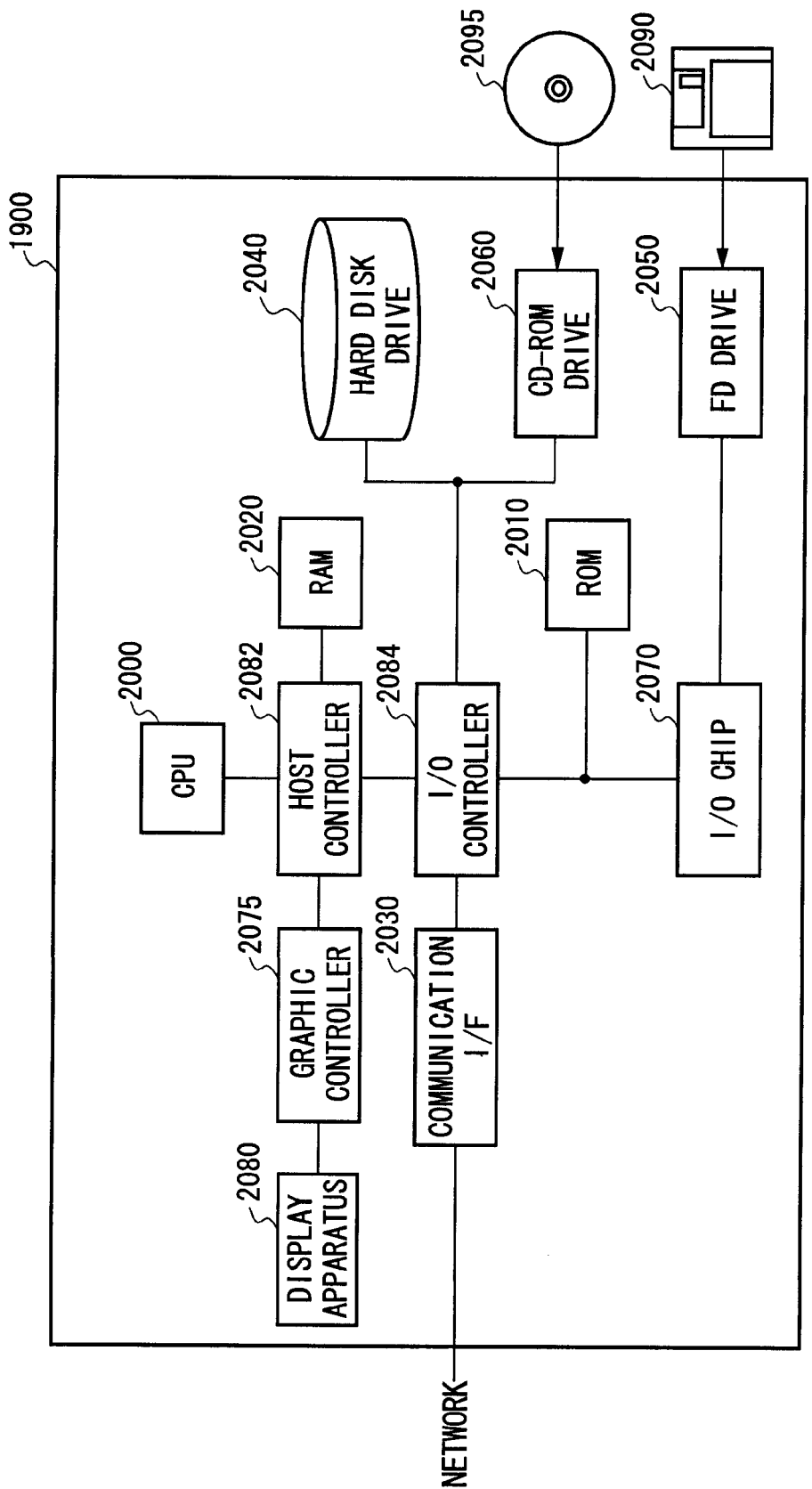
FIG. 10 shows an example of a hardware configuration of a computer 1900 according to an embodiment of the present invention.

FIG. 10 shows an example of a hardware configuration of a computer 1900 according to an embodiment of the present invention. The computer 1900 according to the present embodiment is provided with a CPU peripheral including a CPU 2000, a RAM 2020, a graphic controller 2075, and a display apparatus 2080, all of which are connected to each other by a host controller 2082; an input/output section including a communication interface 2030, a hard disk drive 2040, and a CD-ROM drive 2060, all of which are connected to the host controller 2082 by an input/output controller 2084; and a legacy input/output section including a ROM 2010, a flexible disk drive 2050, and an input/output chip 2070, all of which are connected to the input/output controller 2084.

The host controller 2082 is connected to the RAM 2020 and is also connected to the CPU 2000 and graphic controller 2075 accessing the RAM 2020 at a high transfer rate. The CPU 2000 operates to control each section based on programs stored in the ROM 2010 and the RAM 2020. The graphic controller 2075 acquires image data generated by the CPU 2000 or the like on a frame buffer disposed inside the RAM 2020 and displays the image data in the display apparatus 2080. In addition, the graphic controller 2075 may internally include the frame buffer storing the image data generated by the CPU 2000 or the like.

The input/output controller 2084 connects the communication interface 2030 serving as a relatively high speed input/output apparatus, and the hard disk drive 2040, and the CD-ROM drive 2060 to the host controller 2082. The communication interface 2030 communicates with other apparatuses via a network. The hard disk drive 2040 stores the programs and data used by the CPU 2000 housed in the computer 1900. The CD-ROM drive 2060 reads the programs and data from a CD-ROM 2095 and provides the read information to the hard disk drive 2040 via the RAM 2020.

Furthermore, the input/output controller 2084 is connected to the ROM 2010, and is also connected to the flexible disk drive 2050 and the input/output chip 2070 serving as a relatively high speed input/output apparatus. The ROM 2010 stores a boot program performed when the computer 1900 starts up, a program relying on the hardware of the computer 1900, and the like. The flexible disk drive 2050 reads programs or data from a flexible disk 2090 and supplies the read information to the hard disk drive 2040 via the RAM 2020. The input/output chip 2070 connects the flexible disk drive 2050 to the input/output controller 2084 along with each of the input/output apparatuses via, a parallel port, a serial port, a keyboard port, a mouse port, or the like.

The programs provided to the hard disk drive 2040 via the RAM 2020 are stored in a recording medium, such as the flexible disk 2090, the CD-ROM 2095, or an IC card, and provided by a user. The programs are read from a recording medium, installed in the hard disk drive 2040 inside the computer 1900 via the RAM 2020, and performed by the CPU 2000.

The programs installed in the computer 1900 to make the computer 1900 function as the image processing apparatus 10 are provided with a generation module and an output module. These programs and modules prompt the CPU 2000 or the like to make the computer 1900 function as the generating section 20 and the output section 30, respectively.

The information processes recorded in these programs are read by the computer 1900 to cause the computer 1900 to function as software and hardware described above, which are exemplified by the specific sections of the generating section 20 and the output section 30. With these specific sections, a unique image processing apparatus 10 suitable for an intended use can be configured to function by realizing the calculations or computations appropriate for the intended use of the computer 1900 of the present embodiment.

For example, if there is communication between the computer 1900 and an external apparatus or the like, the CPU 2000 performs the communication program loaded in the RAM 2020, and provides the communication interface 2030 with communication processing instructions based on the content of the process recorded in the communication program. The communication interface 2030 is controlled by the CPU 2000 to read the transmission data stored in the transmission buffer area or the like on the storage apparatus, such as the RAM 2020, the hard disc 2040, the flexible disk 2090, or the CD-ROM 2095, and send this transmission data to the network, and to write data received from the network onto a reception buffer area on the storage apparatus. In this way, the communication interface 2030 may transmit data to and from the storage apparatus through DMA (Direct Memory Access). As another possibility, the CPU 2000 may transmit the data by reading the data from the storage apparatus or communication interface 2030 that are the origins of the transmitted data, and writing the data onto the communication interface 2030 or the storage apparatus that are the transmission destinations.

The CPU 2000 may perform various processes on the data in the RAM 2020 by reading into the RAM 2020, through DMA transmission or the like, all or a necessary portion of the database or files stored in the external apparatus such as the hard disk drive 2040, the CD-ROM drive 2060, the CD-ROM 2095, the flexible disk drive 2050, or the flexible disk 2090. The CPU 2000 writes the processed data back to the external apparatus through DMA transmission or the like. In this process, the RAM 2020 is considered to be a section that temporarily stores the content of the external storage apparatus, and therefore the RAM 2020, the external apparatus, and the like in the present embodiment are referred to as a memory, a storage section, and a storage apparatus. The variety of information in the present embodiment, such as the variety of programs, data, tables, databases, and the like are stored on the storage apparatus to become the target of the information processing. The CPU 2000 can hold a portion of the RAM 2020 in a cache memory and read from or write to the cache memory. With such a configuration as well, the cache memory serves part of the function of the RAM 2020, and therefore the cache memory is also included with the RAM 2020, the memory, and/or the storage apparatus in the present invention, except when a distinction is made.

The CPU 2000 executes the various processes such as the computation, information processing, condition judgment, searching for/replacing information, and the like included in the present embodiment for the data read from the RAM 2020, as designated by the command sequence of the program, and writes the result back onto the RAM 2020. For example, when performing condition judgment, the CPU 2000 judges whether a variable of any type shown in the present embodiment fulfills a condition of being greater than, less than, no greater than, no less than, or equal to another variable or constant. If the condition is fulfilled, or unfulfilled, depending on the circumstances, the CPU 2000 branches into a different command sequence or acquires a subroutine.

The CPU 2000 can search for information stored in a file in the storage apparatus, the database, and the like. For example, if a plurality of entries associated respectively with a first type of value and a second type of value are stored in the storage apparatus, the CPU 2000 can search for entries fulfilling a condition designated by the first type of value from among the plurality of entries stored in the storage apparatus. The CPU 2000 can then obtain the second type of value associated with the first type of value fulfilling the prescribed condition by reading the second type of value stored at the same entry.

The programs and modules shown above may also be stored in an external recording medium. The flexible disk 2090, the CD-ROM 2095, an optical recording medium such as a DVD or CD, a magneto-optical recording medium, a tape medium, a semiconductor memory such as an IC card, or the like can be used as the recording medium. Furthermore, a storage apparatus such as a hard disk or RAM that is provided with a server system connected to the Internet or a specialized communication network may be used to provide the programs to the computer 1900 via the network.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

What is claimed is:

1. An image processing apparatus that stereoscopically displays a two-dimensional image, comprising:
   a generating section that generates a left-side image and a right-side image by shifting the two-dimensional image left and right in a display region; and
   an output section that includes the display region in which a region where the left-side image and the right-side image are not displayed together is arranged outside an effective field of vision, and that outputs, via the region in which the left-side image and the right-side image are not displayed together, the left-side image to a left eye and the right-side image to a right eye,
   wherein the left-side image is shifted by a distance whereby a line of sight of the left eye is shifted left by no more than three degrees from a parallel state, and the right-side image is shifted by a distance whereby line of sight of the right eye is shifted right by no more than three degrees from the parallel state.

2. The image processing apparatus according to claim 1, wherein
   the generating section generates the left-side image and the right-side image based on the same two-dimensional image.

3. The image processing apparatus according to claim 1, wherein
   the output section includes a display section that has a plurality of pixels arranged in a two-dimensional matrix and that includes the display region in which pixel lines that display an image to the left eye and pixel lines that display an image to the right eye are arranged in an alternating manner, and
   the generating section generates the left-side image from pixels of the two-dimensional image corresponding to the pixel lines in the display region that display the image to the left eye, and generates the right-side image from pixels of the two-dimensional image corresponding to the pixel lines in the display region that display the image to the right eye.

4. The image processing apparatus according to claim 1, wherein
   the generating section generates the left-side image and the right-side image by shifting the two-dimensional image to the left and right within the display region by a distance no greater than a distance between a left pupil and a right pupil.

5. The image processing apparatus according to claim 4, wherein
   the generating section generates the left-side image and the right-side image by shifting the two-dimensional image to the left and right within the display region by a distance greater than 0 and less than or equal to 90 mm.

6. The image processing apparatus according to claim 4, further comprising an orientation measuring section that measures orientation of a face with respect to a display section that displays the left-side image and the right-side image, wherein the generating section adjusts the distance between the left-side image and the right-side image according to the face orientation measured by the orientation measuring section.

7. The image processing apparatus according to claim 1, wherein
the generating section adjusts a distance between the left-side image and the right-side image according to a distance between a left pupil and a right pupil.

8. The image processing apparatus according to claim 7, further comprising an inter-pupil distance measuring section that measures the distance between the left pupil and the right pupil, wherein
the generating section adjusts the distance between the left-side image and the right-side image according to the distance measured by the inter-pupil distance measuring section.

9. The image processing apparatus according to claim 1, wherein
the generating section changes a distance between the left-side image and the right-side image according to position within the display region.

10. The image processing apparatus according to claim 1, wherein
the generating section changes a distance between the left-side image and the right-side image according to position in a vertical direction within the display region.

11. The image processing apparatus according to claim 1, wherein
the generating section continuously changes a distance between the left-side image and the right-side image according to position in a vertical direction within the display region.

12. The image processing apparatus according to claim 1, wherein
the generating section shifts each of the left-side image and the right-side image by the same distance in opposite directions from each other.

13. The image processing apparatus according to claim 1, wherein
the image processing apparatus stereoscopically displays a plurality of two-dimensional images included in a moving image, and
the generating section changes a distance between the left-side image and the right-side image of each two-dimensional image according to a parameter designating the distance between the left-side image and the right-side image received in association with the two-dimensional image.

14. The image processing apparatus according to claim 13, wherein
upon receiving, in association with a two-dimensional image included in the moving image, a parameter indicating that the two-dimensional image is not to be displayed stereoscopically, the generating section sets the distance between the left-side image and the right-side image to be 0.

15. The image processing apparatus according to claim 1, further comprising an identifying section that identifies a scene type of the two-dimensional image, wherein
the generating section changes a distance between the left-side image and the right-side image according to the scene type identified by the identifying section.

16. The image processing apparatus according to claim 1, wherein
the generating section changes a distance between the left-side image and the right-side image according to size of the display region in which the left-side image and the right-side image are displayed.

17. The image processing apparatus according to claim 1, further comprising a movement measuring section that measures movement of a head, wherein
the generating section changes positions of the left-side image and the right-side image within the display region according to the head movement.

18. An image processing apparatus that stereoscopically displays a two-dimensional image, comprising:
a generating section that generates a left-side image and a right-side image by shifting the two-dimensional image left and right in a display region; and
an output section that includes the display region in which a region where the left-side image and the right-side image are not displayed together is arranged outside an effective field of vision, and that outputs, via the region in which the left-side image and the right-side image are not displayed together, the left-side image to a left eye and the right-side image to a right eye,
wherein the generating section generates the left-side image and the right-side image when the display region has a width expressed by Expression 1,
Expression 1 is defined as $W \geq (3 \times L) + (2 \times D \times \sin(\theta/2))$,
W represents horizontal width of the display region,
D represents a distance from a viewpoint to a display screen,
L represents a distance between a left pupil and a right pupil, and
$\theta$ represents an angle of an effective field of vision.

19. The image processing apparatus according to claim 1, wherein
the generating section attaches a frame image, to be displayed as a frame, to the left-side image and the right-side image.

20. A non-transitory computer-readable recording medium storing thereon a program that causes a computer to function as the image processing apparatus of claim 1.

21. An image processing method for stereoscopically displaying a two-dimensional image, comprising:
generating a left-side image and a right-side image by shifting the two-dimensional image left and right in a display region by a distance wherein line of sight of a left eye is shifted left by no more than three degrees from a parallel state and line of sight of a right eye is shifted right by no more than three degrees from the parallel state; and
outputting the left-side image to the left eye and the right-side image to the right eye.

22. A recording method for recording image data that enables a two-dimensional image to be displayed stereoscopically, comprising:
generating image data of a left-side image and a right-side image obtained by shifting the two-dimensional image left and right within a display region by a distance whereby line of sight of a left eye is shifted left by no more than three degrees from a parallel state and line of sight of a right eye is shifted right by no more than three degrees from the parallel state;
recording the image data of the left-side image in a left-side image data storage region in a recording medium, the left-side image data storage region holding an image to be read by a reproducing apparatus and output to the left eye; and
recording the image data of the right-side image in a right-side image data storage region in the recording medium, the right-side image data storage region holding an image to be read by the reproducing apparatus and output to the right eye.

23. A non-transitory computer-readable recording medium storing thereon image data to be read by a reproducing apparatus and displayed stereoscopically, the recording medium comprising:
a left-side image data storage region holding image data of a left-side image, from among the left-side image and a right-side image generated by shifting a two-dimensional image left and right within a display region, that is read by the reproducing apparatus and output to a left eye; and
a right-side image data storage region holding image data of the right-side image, from among the left-side image and the right-side image generated by shifting the two-dimensional image left and right within the display region, that is read by the reproducing apparatus and output to a right eye,
wherein the left-side image and the right-side image are generated by shifting the two-dimensional image left and right within a display region by a distance whereby line of sight of the left eye is shifted left by no more than three degrees from a parallel state and line of sight of the right eye is shifted right by no more than three degrees from the parallel state.

24. An image processing method for stereoscopically displaying a two-dimensional image, comprising:
generating a left-side image and a right-side image by shifting the two-dimensional image left and right in a display region; and
outputting the left-side image to a left eye and the right-side image to a right eye;
wherein the generating step generates the left-side image and the right-side image when the display region has a width expressed by Expression 1,
Expression 1 is defined as $W \geq (3 \times L) + (2 \times D \times \sin(\theta/2))$,
W represents horizontal width of the display region,
D represents a distance from a viewpoint to a display screen,
L represents a distance between a left pupil and a right pupil, and
$\theta$ represents an angle of an effective field of vision.

* * * * *